US011695181B2

(12) United States Patent
Nakamura et al.

(10) Patent No.: US 11,695,181 B2
(45) Date of Patent: Jul. 4, 2023

(54) POWER STORAGE MODULE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Tomohiro Nakamura, Kariya (JP); Yuki Chujo, Kariya (JP); Masahiro Yamada, Kariya (JP); Takayuki Hirose, Kariya (JP); Nobuyasu Haga, Seto (JP); Motoyoshi Okumura, Nagoya (JP); Takuro Kikuchi, Tokyo (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 17/043,941

(22) PCT Filed: Apr. 4, 2019

(86) PCT No.: PCT/JP2019/015014
§ 371 (c)(1),
(2) Date: Sep. 30, 2020

(87) PCT Pub. No.: WO2019/194288
PCT Pub. Date: Oct. 10, 2019

(65) Prior Publication Data
US 2021/0020876 A1 Jan. 21, 2021

(30) Foreign Application Priority Data

Apr. 5, 2018 (JP) .................................. 2018-073187
Aug. 22, 2018 (JP) .................................. 2018-155519

(51) Int. Cl.
*H01M 50/183* (2021.01)
*H01M 50/545* (2021.01)
(Continued)

(52) U.S. Cl.
CPC .......... *H01M 50/183* (2021.01); *H01G 11/78* (2013.01); *H01G 11/80* (2013.01);
(Continued)

(58) Field of Classification Search
CPC ............ H01M 50/183; H01M 10/282; H01M 50/545; H01M 2004/029; H01M 10/345;
(Continued)

(56) References Cited

U.S. PATENT DOCUMENTS 5,441,824 A * 8/1995 Rippel .............. H01M 10/0468
429/185
5,556,627 A * 9/1996 LaFollette ............... H01M 4/14
429/228

(Continued)

FOREIGN PATENT DOCUMENTS

JP           4-95341 A       3/1992
JP      2005-503655 A       2/2005
(Continued)

OTHER PUBLICATIONS

Amalpha, Resin-to-metal bonding technology: Bonding Process, https://www.mec-co.com/product/amalpha/en/about/junction/ (Year: 2014).*

(Continued)

*Primary Examiner* — Matthew T Martin
*Assistant Examiner* — Jessie L. Walls
(74) *Attorney, Agent, or Firm* — Sughrue Mion, PLLC

(57) ABSTRACT

A power storage module including: a stacked body that includes electrodes stacked along a first direction; a sealing body that includes a first sealing portion joined to an edge
(Continued)

portion of each of the electrodes, forms an inner space between the electrodes adjacent to each other, and seals the inner space; and an electrolytic solution that is stored in the inner space and includes an alkali solution. The electrodes include bipolar electrodes, and a negative terminal electrode. The power storage module includes surplus spaces different from the inner space on a route of an alkali creep phenomenon in which the electrolytic solution reaches the outside from the inner space through the negative terminal electrode.

10 Claims, 4 Drawing Sheets

(51) Int. Cl.
- *H01G 11/78* (2013.01)
- *H01G 11/80* (2013.01)
- *H01M 50/197* (2021.01)
- *H01M 4/02* (2006.01)
- *H01M 50/60* (2021.01)
- *H01M 10/28* (2006.01)
- *H01M 10/42* (2006.01)
- *H01M 50/77* (2021.01)

(52) U.S. Cl.
CPC ..... *H01M 10/282* (2013.01); *H01M 10/4235* (2013.01); *H01M 50/197* (2021.01); *H01M 50/545* (2021.01); *H01M 50/77* (2021.01); *H01M 50/668* (2021.01); *H01M 2004/029* (2013.01)

(58) Field of Classification Search
CPC ............. H01M 10/4235; H01M 50/77; H01M 50/668; H01M 50/197; H01M 10/28; H01M 4/66; H01M 50/10; H01M 50/543; H01G 11/78; H01G 11/80; H01G 11/12
See application file for complete search history.

(56) References Cited

U.S. PATENT DOCUMENTS

| | | | |
|---|---|---|---|
| 2009/0029260 A1* | 1/2009 | Hagiwara | H01G 11/22 429/246 |
| 2009/0061297 A1* | 3/2009 | Kimura | H01M 50/124 29/623.5 |
| 2018/0205118 A1* | 7/2018 | Chu | H01M 10/0418 |
| 2021/0296706 A1* | 9/2021 | Nakamura | H01M 10/613 |
| 2022/0059912 A1* | 2/2022 | Nakamura | H01M 10/044 |

FOREIGN PATENT DOCUMENTS

| | | |
|---|---|---|
| JP | 2005-135764 A | 5/2005 |
| JP | 2011-204386 A | 10/2011 |
| WO | 03/026055 A1 | 3/2003 |

OTHER PUBLICATIONS

International Search Report for PCT/JP2019/015014 dated Jun. 11, 2019 (PCT/ISA/210).

International Preliminary Report on Patentability (IPRP) with Translation of Written Opinion of the International Searching Authority dated Oct. 15, 2020 in International Application No. PCT/JP2019/015014.

Office Action dated Feb. 18, 2021 in Indian Application No. 202017047313.

* cited by examiner

POWER STORAGE MODULE

CROSS REFERENCE TO RELATED APPLICATIONS

This application is a National Stage of International Application No. Entry of PCT/JP2019/015014 filed Apr. 4, 2019, claiming priority based on Japanese Patent Application No. 2018-073187 filed Apr. 5, 2018 and Japanese Patent Application No. 2018-155519 filed Aug. 22, 2018.

TECHNICAL FIELD

The present disclosure relates to a power storage module.

BACKGROUND ART

As a power storage module in the related art, a bipolar battery including bipolar electrodes in which a positive electrode is formed on one surface of an electrode plate, and a negative electrode is formed on the other surface is known (refer to Patent Literature 1). The bipolar battery includes a stacked body obtained by stacking a plurality of bipolar electrodes through a separator. A sealing body that seals a space between bipolar electrodes adjacent in a stacking direction is provided on a side surface of the stacked body, and an electrolytic solution is stored in an inner space formed between the bipolar electrodes.

CITATION LIST

Patent Literature

Patent Literature 1: Japanese Unexamined Patent Publication No. 2011-204386

SUMMARY OF INVENTION

Technical Problem

In the power storage module as described above, a negative terminal electrode constituted by an electrode plate in which a negative electrode is formed on an inner surface is disposed at one end of the stacked body in a stacking direction. An edge portion of the electrode plate of the negative terminal electrode is also sealed by a sealing body, but if an electrolytic solution is an alkali solution, the electrolytic solution may be transferred to a surface of the electrode plate of the negative terminal electrode due to a so-called alkali creep phenomenon, and may flow between the sealing body and the electrode plate and may seep to an outer surface side of the electrode plate. When the electrolytic solution seeps to the outer surface side and diffuses, for example, there is a concern that corrosion of a conductive plate disposed adjacent to the negative terminal electrode, short-circuiting between the negative terminal electrode and a constraining member, and the like may occur, and thus this is not preferable from the viewpoint of reliability.

An object of the present disclosure is to provide a power storage module capable of improving reliability.

Solution to Problem

According to an aspect of the present disclosure, there is provided a power storage module including: a stacked body including a plurality of electrodes stacked along a first direction; a sealing body including a first sealing portion joined to an edge portion of each of the electrodes, and forming an inner space between the electrodes adjacent to each other and sealing the inner space; and an electrolytic solution being stored in the inner space and including an alkali solution. The electrodes include a plurality of bipolar electrodes, and a negative terminal electrode, the bipolar electrodes include an electrode plate including a first surface and a second surface opposite to the first surface, a positive electrode provided on the first surface, and a negative electrode provided on the second surface, the negative terminal electrode includes an electrode plate including a third surface and a fourth surface opposite to the third surface, and a negative electrode provided on the fourth surface, and is disposed at one end of the stacked body in the first direction so that the fourth surface faces the first surface of the electrode plate of the bipolar electrode, and a surplus space different from the inner space is provided on a route of an alkali creep phenomenon in which the electrolytic solution reaches an outside of the power storage module from the inner space through the negative terminal electrode.

In the power storage module, the surplus space different from the inner space is provided on the route of the alkali creep phenomenon of the electrolytic solution. According to this, it is possible to suppress moisture included in the outside air from entering a gap between the electrode plate of the negative terminal electrode and the first sealing portion which is a starting point of seeping of the electrolytic solution. Accordingly, an influence of outer humidity that is an acceleration condition of the alkali creep phenomenon is suppressed, and thus it is possible to suppress the electrolytic solution from seeping to the outside of the power storage module.

In the power storage module according to the present disclosure, the stacked body may include a metal plate disposed on an outer side in the first direction with respect to the electrode plate of the negative terminal electrode, and the surplus space having air-tightness with respect to the outside of the power storage module may be formed by the first sealing portion, the electrode plate of the negative terminal electrode, and the metal plate. Even in this configuration, the surplus space by the first sealing portion, the negative terminal electrode, and the metal plate is formed on a movement route of the electrolytic solution. Accordingly, it is possible to suppress the electrolytic solution from seeping to the outside of the power storage module.

According to still another aspect of the present disclosure, there is provided a power storage module including: a stacked body including a plurality of electrodes stacked along a first direction; a metal plate being provided in one end of the stacked body in the first direction; a sealing body including a first sealing portion joined to the electrode, and forming an inner space between the electrodes adjacent to each other and sealing the inner space; and an electrolytic solution being stored in the inner space and including an alkali solution. The electrodes include a plurality of bipolar electrodes, and a negative terminal electrode, the sealing body includes a first resin portion disposed between the negative terminal electrode and the metal plate, one surface of the first resin portion in the first direction is joined to the negative terminal electrode, and another surface of the first resin portion in the first direction is joined to the metal plate.

In the power storage module according to the present disclosure, the sealing body includes the first resin portion disposed between the negative terminal electrode and the metal plate, the one surface of the first resin portion in the first direction is joined to the negative terminal electrode, and the other surface of the first resin portion in the first direction is joined to the metal plate. According to this, the surplus space is formed by the first resin portion, the negative terminal electrode, and the metal plate. The surplus space is located on a movement route of the electrolytic solution due to the alkali creep phenomenon. According to this, it is possible to suppress moisture included in the outside air from entering a gap between the electrode plate of the negative terminal electrode and the first sealing portion which is a starting point of seeping of the electrolytic solution. Accordingly, an influence of outer humidity that is an acceleration condition of the alkali creep phenomenon is suppressed, and thus it is possible to suppress the electrolytic solution from seeping to the outside of the power storage module.

In the power storage module according to the present disclosure, the bipolar electrodes may include an electrode plate including a first surface and a second surface opposite to the first surface, a positive electrode provided on the first surface, and a negative electrode provided on the second surface, the negative terminal electrode may include an electrode plate including a third surface and a fourth surface opposite to the third surface, and a negative electrode provided on the fourth surface, and may be disposed between the bipolar electrodes and the metal plate at the one end of the stacked body in the first direction so that the fourth surface faces the first surface of the electrode plate of the bipolar electrodes, and the metal plate may include a fifth surface facing the third surface of the negative terminal electrode, and a sixth surface opposite to the fifth surface, and may be welded to the first resin portion at a peripheral edge portion of the fifth surface. Even in this configuration, the surplus space by the first resin portion, the negative terminal electrode, and the metal plate is formed on the movement route of the electrolytic solution. Accordingly, it is possible to suppress the electrolytic solution from seeping to the outside of the power storage module.

In the power storage module according to the present disclosure, the first sealing portion may include a first resin portion welded to the third surface of the negative terminal electrode, and the metal plate may include a fifth surface facing the third surface of the negative terminal electrode, and a sixth surface opposite to the fifth surface, and may be welded to the first resin portion at a peripheral edge portion of the fifth surface. Even in this configuration, the surplus space by the first sealing portion, the negative terminal electrode, and the metal plate is formed on the movement route of the electrolytic solution. Accordingly, it is possible to suppress the electrolytic solution from seeping to the outside of the power storage module.

The power storage module according to the present disclosure may further include a second sealing portion being joined to a plurality of the first sealing portions and the second resin portion to surround the first sealing portions and the second resin portion from an outer side. The second sealing portion may include an overlapping portion overlapping the metal plate and the second resin portion when viewed from the first direction, and may be welded to the second resin portion at the overlapping portion. In this case, the inner space is reliably sealed by the second sealing portion. In addition, deformation of the second resin portion is suppressed by the overlapping portion of the second sealing portion. As a result, occurrence of a gap between the second resin portion and the sixth surface is suppressed. According to this, leakage due to alkali creep is more reliably suppressed.

In the power storage module according to the present disclosure, the metal plate may include a frame-shaped to-be-welded portion welded to the first resin portion, and a to-be-contact portion that is located closer to the third surface side of the negative terminal electrode in comparison to the to-be-welded portion on an inner side of the to-be-welded portion and being in contact with the third surface. In this case, the surplus space formed between the metal plate and the negative terminal electrode is limited. According to this, an influence of humidity on the surplus space is suppressed.

In the power storage module according to the present disclosure, regions welded to the sealing body located on the third surface, the fifth surface, and the sixth surface may be roughened. According to this configuration, joining strength between the sealing body, and the third surface, the fifth surface, and the sixth surface can be improved due to an anchor effect.

In the power storage module according to the present disclosure, the metal plate may be the electrode plate. In this case, it is not necessary to prepare the metal plate separately from the electrode plate. According to this, the above-described configuration can be realized at the low cost.

Advantageous Effects of Invention

According to the present disclosure, it is possible to provide a power storage module capable of improving reliability.

DESCRIPTION OF EMBODIMENTS

Figure 1:
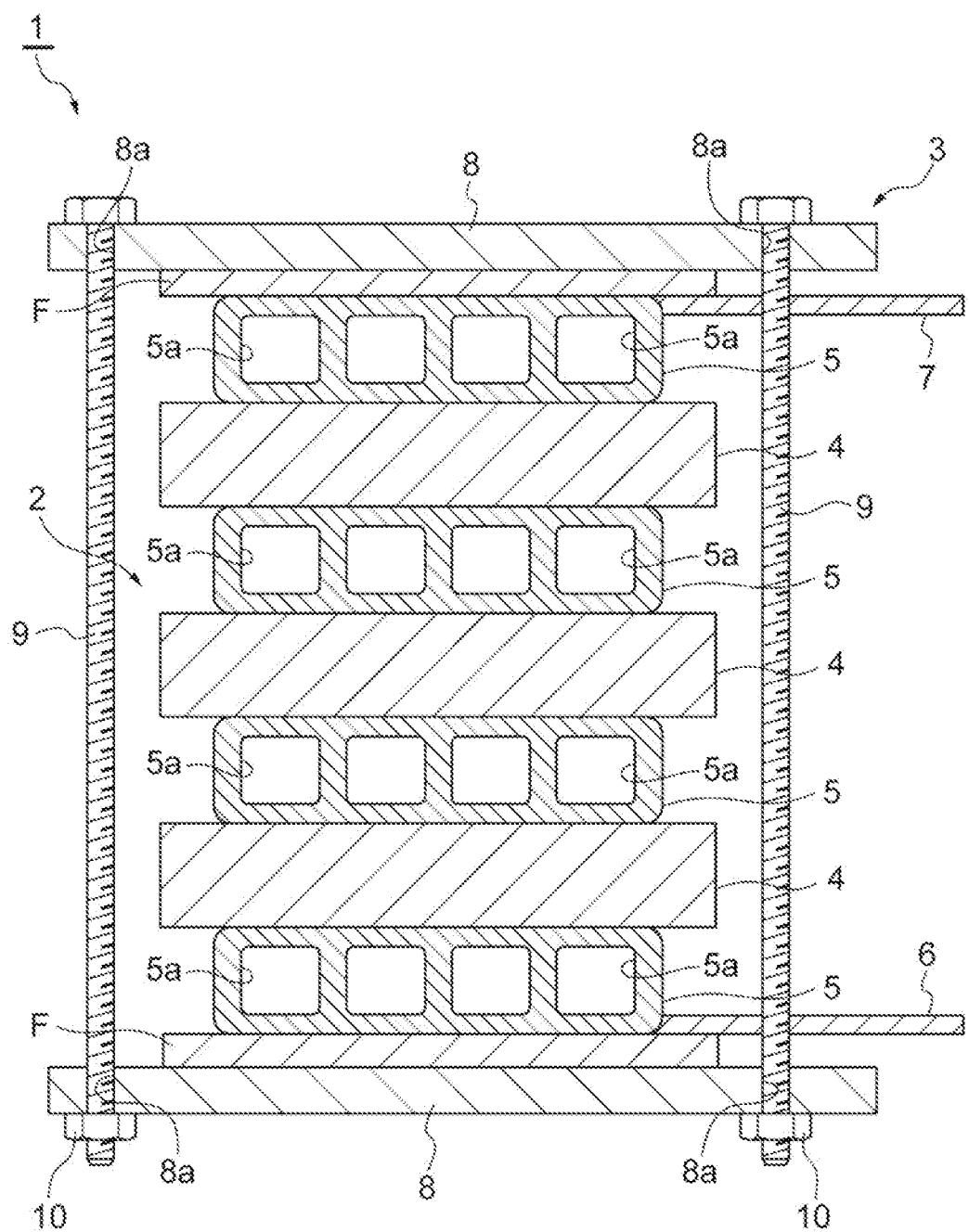
FIG. 1 is a schematic cross-sectional view illustrating an embodiment of a power storage device.

Hereinafter, an embodiment of a power storage module will be described with reference to the accompanying drawings. Note that, the same reference numeral will be given to the same or equivalent element in the description of the drawings, and redundant description thereof will be omitted.

FIG. 1 is a schematic cross-sectional view illustrating an embodiment of a power storage device. A power storage device 1 illustrated in FIG. 1 is used, for example, as batteries of various vehicles such as a forklift, a hybrid vehicle, and an electric vehicle. The power storage device 1 includes a module stacked body 2 including a plurality of power storage modules 4 which are stacked, and a constraining member 3 that applies a constraining load to the module stacked body 2 in a stacking direction thereof.

The module stacked body 2 includes the plurality of (here, three) power storage modules 4 and a plurality of (here, four) conductive plates 5. Each of the power storage modules 4 is a bipolar battery, and has a rectangular shape when viewed from the stacking direction. For example, the power storage module 4 is a secondary battery such as a nickel-hydrogen secondary battery and a lithium ion secondary battery, or an electric double-layer capacitor. In the following description, the nickel-hydrogen secondary battery will be exemplified.

The power storage modules 4 adjacent to each other in the stacking direction are electrically connected to each other through each of the conductive plates 5. The conductive plate 5 is disposed between the power storage modules 4 adjacent to each other in the stacking direction, and on an outer side of the power storage modules 4 located at stacking ends respectively. A positive electrode terminal 6 is connected to one of the conductive plates 5 disposed on an outer side of the power storage modules 4 located at the stacking ends. A negative electrode terminal 7 is connected to the other conductive plate 5 disposed on an outer side of the remaining power storage module 4 located at the stacking ends. For example, the positive electrode terminal 6 and the negative electrode terminal 7 extend from edge portions of the conductive plates 5 in a direction that intersects the stacking direction. Charging and discharging of the power storage device 1 are carried out by using the positive electrode terminal 6 and the negative electrode terminal 7.

A plurality of flow passages 5a through which a coolant such as air is circulated are provided inside the conductive plate 5. For example, the flow passages 5a extend along a direction that intersects (is perpendicular) to the stacking direction and the extension direction of the positive electrode terminal 6 and the negative electrode terminal 7. The conductive plate 5 has a function as a heat dissipation plate for dissipating heat generated in the power storage module 4 by circulating the coolant through the flow passages 5a in addition to a function as a connection member that electrically connects the power storage modules 4 to each other. Note that, in the example illustrated in FIG. 1, an area of the conductive plate 5 when viewed from the stacking direction is smaller than an area of the power storage module 4. However, the area of the conductive plate 5 may be equal to the area of the power storage module 4 or may be greater than the area of the power storage module 4 from the viewpoints of improving heat dissipation.

The constraining member 3 includes a pair of end plates 8 between which the module stacked body 2 is interposed in the stacking direction, and a fastening bolt 9 and a nut 10 which fasten the end plates 8. Each of the end plates 8 is a rectangular metal plate having an area that is slightly larger than the areas of the power storage module 4 and the conductive plate 5 when viewed from the stacking direction. A film F having an electrical insulation property is provided on an inner surface of the end plate 8 (a surface on the module stacked body 2 side). The end plate 8 and the conductive plate 5 are insulated by the film F.

An insertion hole 8a is provided in an edge portion of the end plate 8 at a position on a further outer side in comparison to the module stacked body 2. The fastening bolt 9 passes through the insertion hole 8a of one of the end plates 8 toward the insertion hole 8a of the other end plate 8, and the nut 10 is screwed to a tip end portion of the fastening bolt 9 that protrudes from the insertion hole 8a of the other end plate 8. According to this, the power storage module 4 and the conductive plate 5 are sandwiched by the end plates 8 to form a unit as the module stacked body 2, and a constraining load is applied to the module stacked body 2 in the stacking direction.

Figure 2:
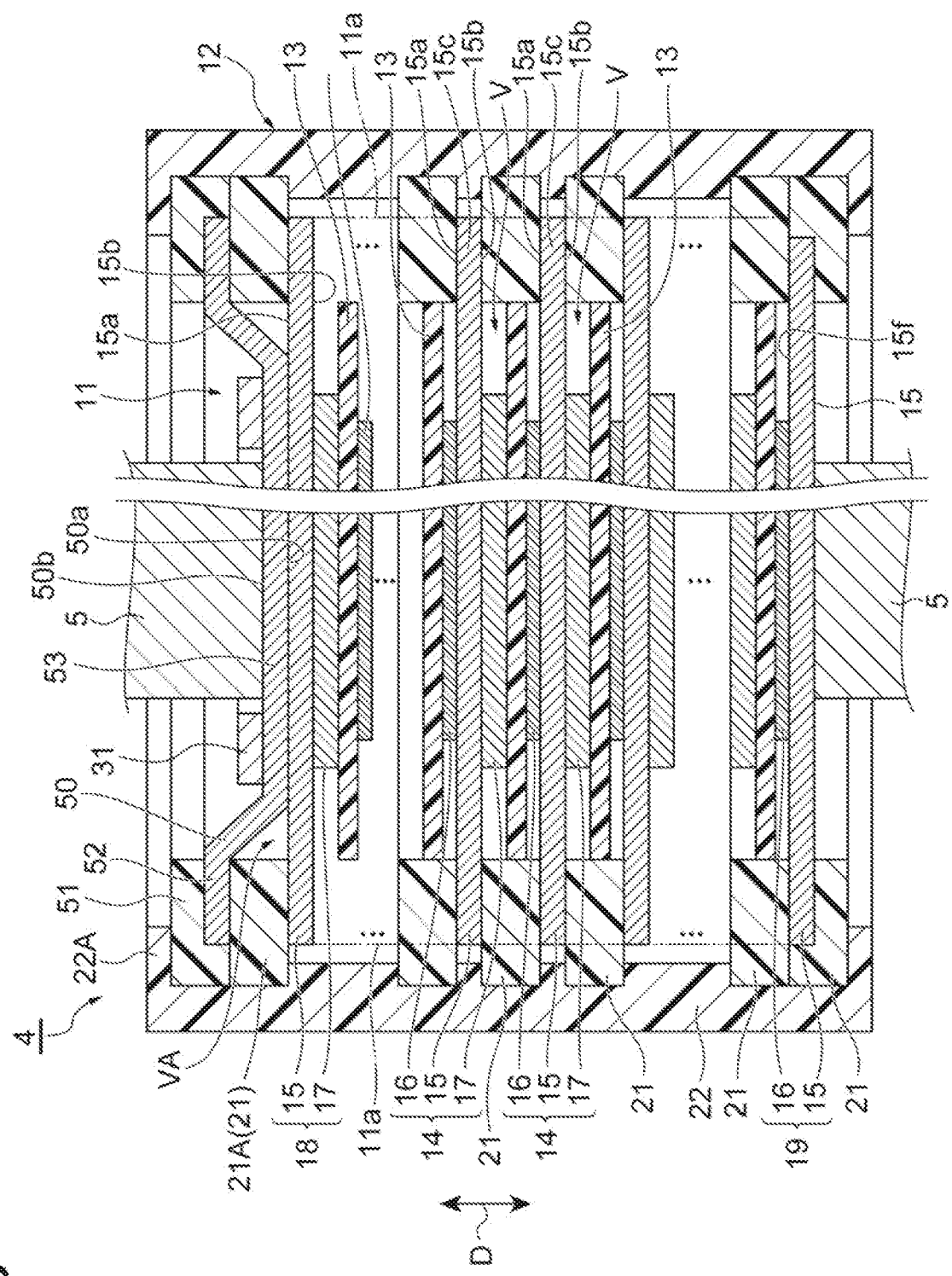
FIG. 2 is a schematic cross-sectional view illustrating an internal configuration of a power storage module illustrated in FIG. 1.
Figure 3:
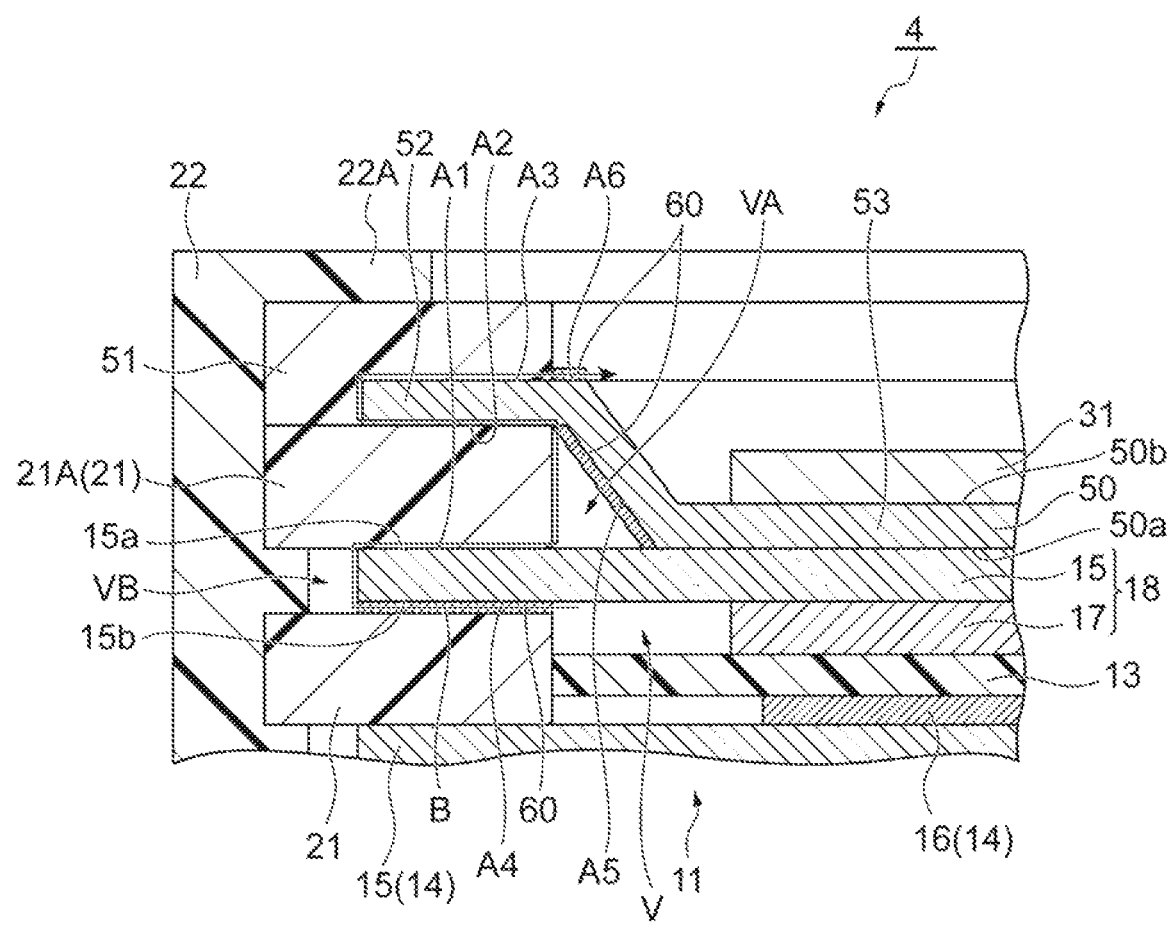
FIG. 3 is a partially enlarged view of FIG. 2.

Next, a configuration of the power storage module 4 will be described in detail. FIG. 2 is a schematic cross-sectional view illustrating an internal configuration of the power storage module illustrated in FIG. 1. FIG. 3 is a partial enlarged view of FIG. 2. As illustrated in FIG. 2 and FIG. 3, the power storage module 4 includes an electrode stacked body (stacked body) 11, and a sealing body 12 that seals the electrode stacked body 11 and is formed from a resin. The electrode stacked body 11 includes a plurality of electrodes (a plurality of bipolar electrodes 14, a single negative terminal electrode (electrode) 18, and a single positive terminal electrode 19) stacked along a stacking direction D (first direction) through a separator 13. Here, the stacking direction D of the electrode stacked body 11 matches the stacking direction of the module stacked body 2. The electrode stacked body 11 includes a side surface 11a that extends in the stacking direction D.

Each of the bipolar electrodes 14, the negative terminal electrode 18, and the positive terminal electrode 19 includes an electrode plate 15 including one surface 15a and the other surface 15b opposite to the one surface 15a. The one surface 15a of the bipolar electrode 14 is a first surface, and the other surface 15b of the bipolar electrode 14 is a second surface. The one surface 15a of the negative terminal electrode 18 is a third surface, and the other surface 15b of the negative terminal electrode 18 is a fourth surface.

The bipolar electrode 14 includes the electrode plate 15, a positive electrode 16 provided on the one surface 15a of the electrode plate 15, and a negative electrode 17 provided on the other surface 15b of the electrode plate 15. The positive electrode 16 is a positive electrode active material layer that is formed by coating a positive electrode active material on the electrode plate 15. The negative electrode 17 is a negative electrode active material layer that is formed by coating a negative electrode active material on the electrode plate 15. In the electrode stacked body 11, the positive electrode 16 of one of the bipolar electrodes 14 faces the negative electrode 17 of another bipolar electrode 14 adjacent in the stacking direction D with the separator 13 interposed therebetween. In the electrode stacked body 11, the negative electrode 17 of one of the bipolar electrodes 14 faces the positive electrode 16 of still another bipolar electrode 14 adjacent in the stacking direction D with the separator 13 interposed therebetween.

The negative terminal electrode 18 includes the electrode plate 15, and the negative electrode 17 that is provided on the other surface 15b of the electrode plate 15. The negative terminal electrode 18 is disposed at one end of the stacking direction D so that the other surface 15b is positioned on an inner side of the electrode stacked body 11 (a central side with respect to the stacking direction D). The negative electrode 17 of the negative terminal electrode 18 faces the positive electrode 16 of the bipolar electrode 14 on one end in the stacking direction D through the separator 13. The positive terminal electrode 19 includes the electrode plate 15, and a positive electrode 16 provided on the one surface 15a of the electrode plate 15. The positive terminal electrode 19 is disposed on the other end in the stacking direction D so that the one surface 15a is positioned on the inner side of the electrode stacked body 11. The positive electrode 16 of the positive terminal electrode 19 faces the negative electrode 17 of the bipolar electrode 14 at the other end in the stacking direction D through the separator 13.

The one surface 15a of the electrode plate 15 of the negative terminal electrode 18 is a surface that faces an outer side of the electrode stacked body 11. A conductive plate 5 is electrically connected to the one surface 15a of the negative terminal electrode 18 through a metal plate 50 to be described later. In addition, another conductive plate 5 that is adjacent to the power storage module 4 is in contact with the other surface 15b of the electrode plate 15 of the positive terminal electrode 19. A constraining load from the constraining member 3 is applied from the negative terminal electrode 18 and the positive terminal electrode 19 to the electrode stacked body 11 through the conductive plates 5. That is, the conductive plates 5 are also constraining members which apply the constraining load to the electrode stacked body 11 along the stacking direction D.

For example, the electrode plate 15 is formed from a metal such as nickel or a nickel-plated steel plate. As an example, the electrode plate 15 is rectangular metal foil formed from nickel. An edge portion 15c of the electrode plate 15 (edge portions of the bipolar electrodes 14, the negative terminal electrode 18, and the positive terminal electrode 19) has a rectangular frame shape, and is an uncoated region that is not coated with the positive electrode active material and the negative electrode active material. Examples of the positive electrode active material that constitutes the positive electrode 16 include nickel hydroxide. Examples of the negative electrode active material that constitutes the negative electrode 17 include a hydrogen occluding alloy. In this embodiment, a formation region of the negative electrode 17 on the other surface 15b of the electrode plate 15 is slightly greater than a formation region of the positive electrode 16 on the one surface 15a of the electrode plate 15.

For example, the separator 13 is formed in a sheet shape. Examples of the separator 13 include a porous film formed from a polyolefin-based resin such as polyethylene (PE) and polypropylene (PP), and a woven or non-woven fabric formed from polypropylene, methyl cellulose, or the like. In addition, the separator 13 may be reinforced with a vinylidene fluoride resin compound. Note that, the separator 13 is not limited to the sheet shape, and a bag-shaped separator may be used.

For example, the sealing body 12 is formed from an insulating resin in a rectangular tube shape as a whole. The sealing body 12 is provided on the side surface 11a of the electrode stacked body 11 to surround a plurality of the edge portions 15c. The sealing body 12 holds the edge portions 15c at the side surface 11a. The sealing body 12 includes a plurality of first sealing portions 21 welded to the edge portions 15c, and a single second sealing portion 22 that is joined to the first sealing portions 21 to surround the first sealing portion 21 from the outer side thereof along the side surface 11a.

The first sealing portions 21 have a rectangular annular shape when viewed from the stacking direction D, and are provided continuously over the entire periphery of the edge portions 15c. Each of the first sealing portions 21 is welded to the one surface 15a of each of the electrode plates 15 and is air-tightly joined thereto. For example, the first sealing portion 21 is welded by ultrasonic waves or heat. The first sealing portion 21 is a film having a predetermined thickness (a length in the stacking direction D). An end surface of the electrode plate 15 is exposed from the first sealing portion 21. A part of the first sealing portion 21 on an inner side is located between the edge portions 15c of the electrode plates 15 adjacent to each other in the stacking direction D, and a part thereof on an outer side extends from the electrode plate 15. The first sealing portion 21 is held by the second sealing portion 22 at the part on the outer side. The first sealing portions 21 adjacent to each other along the stacking direction D are spaced apart from each other. The first sealing portions 21 include a first resin portion 21A that is welded to the one surface 15a of the negative terminal electrode 18. Here, one of the first sealing portions 21 is the first resin portion 21A. Note that, the first sealing portion 21 may also be welded to the other surface 15b side of the electrode plate 15 of the positive terminal electrode 19.

The second sealing portion 22 is provided on an outer side of the electrode stacked body 11 and the first sealing portion 21, and constitutes an outer wall (casing) of the power storage module 4. For example, the second sealing portion 22 is formed by injection molding of a resin, and extends over the entire length of the electrode stacked body 11 along the stacking direction D. The second sealing portion 22 has a tubular shape (annular shape) that extends with the stacking direction D set as an axial direction. For example, the second sealing portion 22 is welded (joined) to outer surface of the first sealing portion 21 with heat at the time of the injection molding.

The second sealing portion 22 seals a portion between the bipolar electrodes 14 adjacent to each other along the stacking direction D, a portion between the negative terminal electrode 18 and the bipolar electrode 14 adjacent to each other along the stacking direction D, and a portion between the positive terminal electrode 19 and the bipolar electrode 14 adjacent to each other along the stacking direction D in combination with the first sealing portions 21. According to this, an inner space V that is air-tightly partitioned is formed between the bipolar electrodes 14, between the negative terminal electrode 18 and the bipolar electrode 14, and between the positive terminal electrode 19 and the bipolar electrode 14. That is, the first sealing portion 21 and the second sealing portions 22 are provided to form the inner space V between electrodes adjacent to each other, and to seal the inner space V. For example, an electrolytic solution (not illustrated) including an alkali solution such as a potassium hydroxide aqueous solution is stored in the inner space V. The electrolytic solution is impregnated in the separator 13, the positive electrode 16, and the negative electrode 17.

Here, the power storage module 4 includes a metal plate 50 and a second resin portion 51. The metal plate 50 is provided in one end (end on the negative terminal electrode 18 side) of the electrode stacked body 11 in the stacking direction D. The metal plate 50 includes one surface 50a and the other surface 50b opposite to the one surface 50a. The one surface 50a of the metal plate 50 faces the one surface 15a of the electrode plate 15 of the negative terminal electrode 18. The other surface 50b of the metal plate 50 is in contact with the conductive plate 5. The metal plate 50 is stacked along the stacking direction D in combination with the electrodes. According to this, the negative terminal electrode 18 is disposed between the metal plate 50 and the bipolar electrode 14 along the stacking direction D. In other words, in the power storage module 4, the metal plate 50 is provided on a further outer side of the negative terminal electrode 18. The one surface 50a of the metal plate 50 is a fifth surface, and the other surface 50b of the metal plate 50 is a sixth surface.

The metal plate 50 is welded to the first resin portion 21A and is in contact with the one surface 15a of the negative terminal electrode 18. More specifically, the metal plate 50 includes a rectangular annular to-be-welded portion 52 that is disposed on the first resin portion 21A and the one surface 15a and is welded to the first resin portion 21A, and a rectangular to-be-contact portion 53 that is located closer to the one surface 15a of the negative terminal electrode 18 in comparison to the to-be-welded portion 52 on an inner side of the to-be-welded portion 52 (is recessed to the one surface 15a side) and is in contact with the one surface 15a. The to-be-welded portion 52 and the to-be-contact portion 53 are continuous to each other. A surplus space VA corresponding to the thickness (length along the stacking direction D) of the first resin portion 21A can be formed between the metal plate 50 and the negative terminal electrode 18 (between the one surface 50a of the metal plate 50 and the one surface 15a of the electrode plate 15). However, since the metal plate 50 is recessed to the negative terminal electrode 18 side at the to-be-contact portion 53, the surplus space VA is limited to be narrow. Note that, the metal plate 50 can be constituted by an arbitrary metal, but can be set to be the same as the electrode plate 15 as an example. That is, as an example, the metal plate 50 is the electrode plate 15. In this case, the metal plate 50 is metal foil (uncoated foil) in which an active material layer is not formed.

The second resin portion 51 has an approximately the same shape as in the first resin portion 21A when viewed from the stacking direction D. That is, the second resin portion 51 is a film that has a rectangular annular shape and a predetermined thickness. The second resin portion 51 extends and is disposed to extend from a peripheral edge portion of the other surface 50b of the metal plate 50 to the first resin portion 21A. The second resin portion 51 is welded to the other surface 50b and the first resin portion 21A. The second sealing portion 22 is joined to a plurality of the first sealing portions 21 and the second resin portion 51 to surround the first sealing portions 21 and the second resin portion 51 from the outer side. The second sealing portion 22 includes an overlapping portion 22A that overlaps the metal plate 50 and the second resin portion 51 when viewed from the stacking direction D, and is welded to the second resin portion 51 at the overlapping portion 22A.

The first sealing portions 21 (first resin portion 21A), the second sealing portion 22, and the second resin portion 51 can be constituted by, for example, polypropylene (PP), polyphenylene sulfide (PPS), modified polyphenylene ether (modified PPE), or the like that is an insulating resin.

Note that, regions which are welded to the first resin portion 21A or the second resin portion 51 are formed in the one surface 15a of the electrode plate 15, the one surface 50a and the other surface 50b of the metal plate 50. Specifically, when viewed from the stacking direction D, a region A1 that overlaps the first resin portion 21A in the one surface 15a of the electrode plate 15, and a region A2 that overlaps the first resin portion 21A in the one surface 50a of the metal plate 50 are regions which are welded to the first resin portion 21A. In addition, when viewed from the stacking direction D, a region A3 that overlaps the second resin portion 51 in the other surface 50b of the metal plate 50 is a region that is welded to the second resin portion 51. The regions A1 to A3 have a rectangular annular shape. At least the regions A1 to A3 are roughened. Here, the entirety of the one surface 15a of the electrode plate 15, and the one surface 50a and the other surface 50b of the metal plate 50 are roughened.

The one surface 15a of the electrode plate 15, and the one surface 50a and the other surface 50b of the metal plate 50 are roughened, for example, by forming a plurality of protrusions in an electrolytic plating process. According to this, at a joining interface with the first resin portion 21A or the second resin portion 51 in the one surface 15a of the electrode plate 15, and the one surface 50a and the other surface 50b of the metal plate 50, the first resin portion 21A or the second resin portion 51 in a molten state enters concave portions formed by the roughening, and thus an anchor effect is exhibited. According to this, a joining force can be improved. For example, the protrusions formed at the time of the roughening have a shape that is tapered from a base end side to a tip end side. Accordingly, a cross-sectional shape between adjacent protrusions becomes an undercut shape, and the anchor effect is likely to occur.

Here, the power storage module 4 may further include a water repellent material 60. The water repellent material 60 can be provided in a region that is not applied to welding in the one surface 15a and the other surface 15b of the electrode plate 15, and the one surface 50a and the other surface 50b of the metal plate 50. Here, the water repellent material 60 is provided in a region A4, which faces the first sealing portion 21, on the other surface 15b of the negative terminal electrode 18, a region A5, which extends from the region A2 welded to the first resin portion 21A located on the one surface 50a of the metal plate 50 to an inner side of the one surface 50a and a region A6, which extends from the region A3 to which the second resin portion 51 on the other surface 50b of the metal plate 50 is welded to an inner side of the other surface 50b. However, the water repellent material 60 may be provided at least one among the regions A4 to A6. The region A4 faces the first sealing portion 21 welded to the bipolar electrode 14 adjacent to the negative terminal electrode 18. The region A5 is a region that faces the surplus space VA. The region A6 is a region that faces the outer side of the power storage module 4.

The water repellent material 60 is formed in a film shape as an example. The water repellent material 60 can be formed by applying a fluorine-based resin material (for example, "OS-90HF" manufactured by Harves Co., Ltd.), a fluororubber, a polymer having a fluorine-based/methyl-based functional group, or the like.

In addition, the power storage module 4 may further include a liquid absorbing member 31. The liquid absorbing member 31 is provided on the other surface 50b of the metal plate 50. The liquid absorbing member 31 is formed in a sheet shape, for example, by a non-woven fabric. Examples of the material that constitutes this non-woven fabric include polyolefin. The non-woven fabric may be subjected to a plasma treatment to improve a water absorption property. For example, the thickness of the liquid absorbing member 31 (a length along the stacking direction D) is approximately several hundred μm. For example, the liquid absorbing member 31 has a rectangular circular shape when viewed from the stacking direction D, and surrounds the conductive plate 5.

Next, an example of a method of manufacturing the power storage device 1 will be described. In this method, first, the power storage module 4 is manufactured. The method of manufacturing the power storage module 4 includes a primary molding process, a stacking process, a secondary molding process, and an injection process. In the primary molding process, a predetermined number of bipolar electrodes 14, the negative terminal electrode 18, and the positive terminal electrode 19 are prepared, and the first sealing portion 21 is welded to the one surface 15a of the edge portion 15c of each electrode plate 15. In addition, the metal plate 50 is prepared, and the second resin portion 51 is welded to the other surface 50b thereof.

In the stacking process, the bipolar electrode 14, the negative terminal electrode 18, and the positive terminal electrode 19 are stacked through the separator 13 so that the first sealing portion 21 is disposed between the edge portions 15c of two pieces of the electrode plates 15, thereby forming the electrode stacked body 11. In addition, the metal plate 50 is disposed at one end of the electrode stacked body 11 so that the second resin portion 51 is disposed on the first resin portion 21A. In the secondary molding process, after the electrode stacked body 11 and the metal plate 50 are disposed in a mold (not illustrated) of injection molding, a molten resin is injected into the mold to form the second sealing portion 22 so as to surround the first sealing portion 21 and the second resin portion 51. According to this, the sealing body 12 is formed on the side surface 11a of the electrode stacked body 11. In the injection process, the electrolytic solution is injected to the inner space V between the bipolar electrodes 14 and 14 after the secondary molding process. According to this, the power storage module 4 is obtained.

Figure 4:
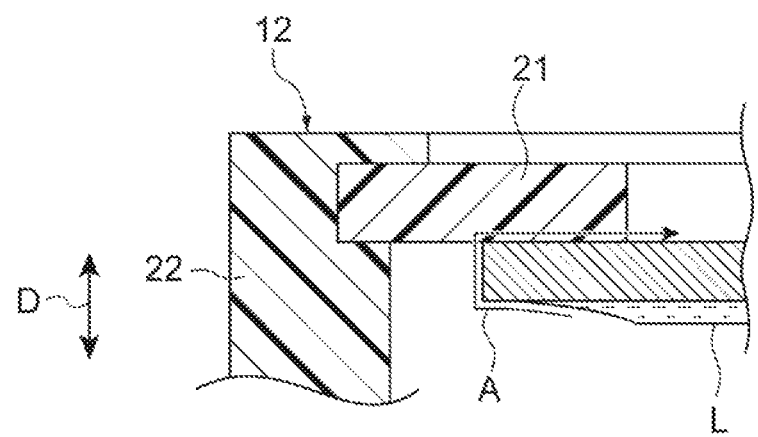
FIG. 4 is an enlarged cross-sectional view of a part of a power storage module according to a comparative example.

Next, an operation and an effect of the power storage module 4 will be described. FIG. 4 is an enlarged cross-sectional view of a part of the power storage module according to a comparative example. In an example illustrated in FIG. 4, the metal plate 50 is not provided. Therefore, for example, when a load is applied to the electrode plate 15 of the negative terminal electrode 18 in accordance with an increase in an inner pressure, there is a concern that the first resin portion 21A welded to the electrode plate 15 may be deformed. In this case, a gap occurs between the first resin portion 21A and the electrode plate 15, and thus there is a concern that leakage of an electrolytic solution L may occur through the gap.

In the power storage module, the electrolytic solution L may be transferred onto the electrode plate 15 of the negative terminal electrode 18 due to a so-called alkali creep phenomenon, and may seep to the one surface 15a side of the electrode plate 15 through the gap between the first resin portion 21A and the electrode plate 15. In FIG. 4, a movement route of the electrolytic solution L in the alkali creep phenomenon is indicated by an arrow A. The alkali creep phenomenon may occur at the time of charging and discharging the power storage device and at the time of no load due to electrochemical factors, a fluid phenomenon, and the like. The alkali creep phenomenon occurs due to the existence of a negative electrode potential, moisture, and a movement path of the electrolytic solution L.

In contrast, in the power storage module 4, the inner space V that stores the electrolytic solution is formed between the electrodes of the electrode stacked body 11 by the first sealing portion 21. In addition, among a plurality of electrodes, the negative terminal electrode 18 is disposed at one end of the electrode stacked body 11 so that the other surface 15b of the electrode plate 15 faces the one surface 15a of the electrode plate 15 of the bipolar electrode 14. The first resin portion 21A as the first sealing portion 21 is welded to the one surface 15a, which faces an outer side of the electrode stacked body 11, in the negative terminal electrode 18. On the other hand, the metal plate 50 is provided in the one end of the electrode stacked body 11. According to this, the negative terminal electrode 18 is disposed between the bipolar electrode 14 among the electrode and the metal plate 50. That is, the metal plate 50 is provided on a further outer side of the negative terminal electrode 18. In addition, the metal plate 50 is welded to the first resin portion 21A welded to the one surface 15a of the negative terminal electrode 18 at a peripheral edge portion of the one surface 50a of the metal plate 50 which faces the one surface 15a of the negative terminal electrode 18.

According to this configuration, the following effect is obtained. That is, as a first effect, since the metal plate 50 having rigidity higher than that of the first resin portion 21A is welded to the first resin portion 21A on the one surface 15a of the negative terminal electrode 18, deformation of the first resin portion 21A in which the first resin portion 21A and the one surface 15a of the negative terminal electrode 18 are peeled off is suppressed. In addition, as a second effect, since the metal plate 50 is also provided on the outer side of the negative terminal electrode 18, intrusion of moisture into the inner space V from the outside is suppressed. In addition, as a third effect, on a route leading to the outside of the power storage module through the negative terminal electrode 18, a seal of at least two stages is formed at a welding site between the one surface 15a of the negative terminal electrode 18 and the first resin portion 21A, and a welding site between the one surface 50a of the metal plate 50 and the first resin portion 21A.

A gap, which may be a leakage route of the electrolytic solution due to the alkali creep phenomenon, is prevented from occurring between the first resin portion 21A and the one surface 15a of the negative terminal electrode 18 due to the first effect. In addition, an influence of external humidity that is an acceleration condition for the alkali creep is suppressed due to the second effect. In addition, a leakage rate is reduced by the multi-stage seal due to the third effect. According to the power storage module 4, since the effects are obtained in combination, the leakage due to the alkali creep is reliably suppressed. As a result, reliability is improved.

In addition, the power storage module 4 further includes the second resin portion 51 that is disposed to extend from the peripheral edge portion of the other surface 50b of the metal plate 50 to the first resin portion 21A, and is welded to the other surface 50b and the first resin portion 21A. In addition, the region A3, to which the second resin portion 51 is welded, of the other surface 50b is roughened. Accordingly, on a route leading to the outside from the negative terminal electrode 18, a seal is also formed as a welding site (region A3) between the other surface 50b of the metal plate 50 and the second resin portion 51. As a result, the leakage rate is reliably reduced due to the multi-stage (three-stage) seal, and leakage due to the alkali creep is more reliably suppressed.

In addition, the power storage module 4 further includes the second sealing portion 22 that is joined to a plurality of the first sealing portions 21 and the second resin portion 51 to surround the first sealing portions 21 and the second resin portion 51 from an outer side. The second sealing portion 22 includes the overlapping portion 22A that overlaps the metal plate 50 and the second resin portion 51 when viewed from the stacking direction D, and is welded to the second resin portion 51 at the overlapping portion 22A. According to this, the inner space V is reliably sealed by the second sealing portion 22. In addition, deformation of the second resin portion 51 is suppressed due to the overlapping portion 22A of the second sealing portion 22, and a result, occurrence of a gap between the second resin portion 51 and the other surface 50b of the metal plate 50 is suppressed. According to this, leakage due to the alkali creep is more reliably suppressed.

In addition, in the power storage module 4, the metal plate 50 includes the annular to-be-welded portion 52 that is welded to the first resin portion 21A, and the to-be-contact portion 53 that is located on the one surface 15a side of the negative terminal electrode 18 in comparison to the to-be-welded portion 52 on an inner side of the to-be-welded portion 52, and is in contact with the one surface 15a. According to this, the surplus space VA formed between the metal plate 50 and the negative terminal electrode 18 is limited. Accordingly, an effect of humidity in the surplus space VA is suppressed.

In addition, in the power storage module 4, the metal plate 50 is the electrode plate 15. According to this, it is not necessary to prepare the metal plate 50 separately from the electrode plate 15. Accordingly, the above-described configuration can be realized at the low cost.

In addition, in the power storage module 4, the water repellent material 60 is provided in the region A4, which faces the first sealing portion 21, on the other surface 15b of the negative terminal electrode 18, and the region A5, which extends from the region A2 welded to the first resin portion 21A located on the one surface 50a of the metal plate 50 to the inner side of the one surface 50a. When the water repellent material 60 is provided in the region A4, leakage of the electrolytic solution from the inner space V can be suppressed. In addition, when the water repellent material 60 is provided in the region A5, leakage from the surplus space VA to the outside, and intrusion of moisture into the surplus space VA from the outside are suppressed.

In addition, in the power storage module 4, the water repellent material 60 is provided in the region A6, which extends from the region A3 to which the second resin portion 51 located on the other surface 50b of the metal plate 50 is welded to the inner side of the other surface 50b. According to this, intrusion of moisture into the surplus space VA from the outside is reliably suppressed.

In the embodiment, description has been given of an embodiment of the power storage module according to the present disclosure. Accordingly, the power storage module according to the present disclosure can be modified in an arbitrary manner without limitation to the above-described power storage module 4.

For example, in the power storage module 4, a sealing material can be provided instead of the water repellent material 60. That is, the sealing material can be provided in at least one of the regions A4, A5, and A6. For example, the sealing material is a cured product of a liquid sealing agent. In this case, formation of the sealing material is easy. Note that, examples of the liquid sealing agent include a polyolefin-based resin material such as polypropylene (PP), an adhesive (asphalt pitch) containing blown asphalt as a main component, and the like. For example, the asphalt pitch is obtained by dissolving blown asphalt and polybutene in toluene. Specifically, the sealing material can be formed by applying the liquid sealing agent to at least one of the regions A4, A5, and A6, and by curing the liquid sealing agent. Even when providing the sealing material instead of the water repellent material 60, the same effect as in the water repellent material 60 can be obtained.

In addition, both the water repellent material 60 and the sealing material can be provided in the power storage module 4. That is, the water repellent material 60 may be provided in parts of the regions A4, A5, and A6, and the sealing material may be formed in the remaining parts. In this manner, in the power storage module 4, the water repellent material 60 and the sealing material can be selectively used in correspondence with characteristics required for the regions, and a state of each of the regions.

Next, the surplus space of the power storage module 4 will be described in more detail with reference to FIG. 2 and FIG. 3. As illustrated in FIG. 2 and FIG. 3, the power storage module 4 includes the surplus space VA different from the inner space V. The surplus space VA does not store the electrolytic solution at the time of manufacturing. The surplus space VA has air-tightness with respect to the outside. The surplus space VA is formed by the metal plate 50, the electrode plate 15 of the negative terminal electrode 18, and the first resin portion 21A. One surface of the first resin portion 21A in the stacking direction D (first direction) is joined to the electrode plate 15 of the negative terminal electrode 18, and the other surface of the first resin portion 21A in the stacking direction D is joined to the one surface 50a of the metal plate 50. When viewed from the stacking direction D, the surplus space VA is formed to surround the periphery of the to-be-contact portion 53. When viewed from a cross-section along the stacking direction D, the surplus space VA has an approximately triangular shape in which the height (a dimension along the stacking direction D) decreases as going from the first resin portion 21A side toward the to-be-contact portion 53 side. In addition, the power storage module 4 includes a surplus space VB different form the inner space V and the surplus space VA. The surplus space VB also does not store the electrolytic solution at the time of manufacturing. The surplus space VB is formed by the electrode plate 15 of the negative terminal electrode 18, the first sealing portion 21 (first resin portion 21A), and the second sealing portion 22. The surplus space VB is formed to surround an outer side of an edge portion of the electrode plate 15 of the negative terminal electrode 18 to which the first resin portion 21A is joined. When viewed from a cross-section along the stacking direction D, the surplus space VB has an approximately rectangular shape.

Any of the surplus space VA and the surplus space VB is provided on a movement route of the electrolytic solution from the inner space V to the outside of the power storage module 4 through the negative terminal electrode 18 due to the alkali creep phenomenon. As indicated by an arrow B in FIG. 3, the movement route of the electrolytic solution which is assumed when the alkali creep phenomenon occurs in the power storage module 4 is a route including a gap between the first sealing portion 21 and the electrode plate 15 of the negative terminal electrode 18, the surplus space VB, a gap between the electrode plate 15 of the negative terminal electrode 18 and the first resin portion 21A, the surplus space VA, and a gap between the metal plate 50 and the second resin portion 51.

As described above, the power storage module 4 includes the surplus space VB that does not store the electrolytic solution at the time of manufacturing on the movement route of the electrolytic solution due to the alkali creep phenomenon as indicated by the arrow B in FIG. 3. In this manner, since the surplus space VB is provided on the movement route of the electrolytic solution, it is possible to suppress moisture contained in the outside air from entering a gap with the electrode plate 15 of the negative terminal electrode 18 which is a starting point of seeping of the electrolytic solution. Accordingly, an influence of outer humidity that is an acceleration condition of the alkali creep phenomenon is suppressed, and thus the electrolytic solution is suppressed from seeping to the outside of the power storage module 4. As a result, reliability of the power storage module 4 is improved.

In addition, the electrode stacked body 11 includes the metal plate 50 that is disposed on an outer side in the first direction with respect to the electrode plate 15 of the negative terminal electrode 18, and the surplus space VA having air-tightness with respect to the outside is formed by the first resin portion 21A, the electrode plate 15 of the negative terminal electrode 18, and the metal plate 50. In this manner, since the surplus space VA is further provided on the movement route of the electrolytic solution due to the alkali creep phenomenon, it is possible to more reliably suppress moisture contained in the outer air from entering a gap with the electrode plate 15 of the negative terminal electrode 18 which is a starting point of seeping of the electrolytic solution. Accordingly, the electrolytic solution is suppressed from seeping to the outside of the power storage module 4. As a result, reliability of the power storage module 4 is further improved.

Note that, in the embodiment, description has been given of an example in which the electrode stacked body 11 of the power storage module 4 includes the metal plate 50 on an outer side of the negative terminal electrode 18, but the electrode stacked body 11 may not include the metal plate 50. In this case, the power storage module 4 may not include the surplus space VA.

In addition, in the embodiment, description has been given of an example in which the power storage module 4 includes two surplus spaces VA and VB, but the power storage module 4 may include at least one surplus space on the movement route of the electrolytic solution when the alkali creep phenomenon occurs, and the number of the surplus spaces is not particularly limited.

In addition, in the embodiment, description has been given of an example in which the surplus space VA is formed by the metal plate 50, the electrode plate 15 of the negative terminal electrode 18, and the first resin portion 21A, and the surplus space VB is formed by the electrode plate 15 of the negative terminal electrode 18, the first sealing portion 21 (first resin portion 21A), and the second sealing portion 22, but constituent elements of the power storage module 4 which form the surplus space is not particularly limited.

REFERENCE SIGNS LIST

4: power storage module, 11: electrode stacked body (stacked body), 14: bipolar electrode, 15: electrode plate, 15a, 50a: one surface, 15b, 50b: other surface, 17: negative electrode, 18: negative terminal electrode, 21: first sealing portion, 21A: first resin portion, 22: second sealing portion, 22A: overlapping portion, 50: metal plate, 51: second resin portion, 52: to-be-welded portion, 53: to-be-contact portion, 60: water repellent material, A1 to A6: region, VA, VB: surplus space.

The invention claimed is:

1. A power storage module, comprising:
   a stacked body including a plurality of electrodes stacked along a first direction;
   a sealing body including a first sealing portion joined to an edge portion of each of the electrodes, and forming an inner space between the electrodes adjacent to each other and sealing the inner space; and
   an electrolytic solution being stored in the inner space and including an alkali solution,
   wherein the electrodes include a plurality of bipolar electrodes, and a negative terminal electrode,
   the bipolar electrodes include an electrode plate including a first surface and a second surface opposite to the first surface, a positive electrode provided on the first surface, and a negative electrode provided on the second surface,
   the negative terminal electrode includes an electrode plate including a third surface and a fourth surface opposite to the third surface, and a negative electrode provided on the fourth surface, and is disposed at one end of the stacked body in the first direction so that the fourth surface of the electrode plate of the negative terminal electrode faces the first surface of the electrode plate of the bipolar electrode,
   a surplus space different from the inner space is provided on a route in which the electrolytic solution reaches an outside of the power storage module from the inner space through the negative terminal electrode,
   the stacked body includes a metal plate disposed on an outer side in the first direction with respect to the electrode plate of the negative terminal electrode, wherein an inner surface of the metal plate faces the third surface of the electrode plate of the negative terminal electrode, and wherein an outer surface of the metal plate is opposite from the inner surface of the metal plate,
   wherein the first sealing portion includes a second resin portion having an annular shape, the second resin portion being disposed at a peripheral edge portion of the outer surface of the metal plate so that a central region of the outer surface of the metal plate is not covered by the second resin portion, and the metal plate is welded to the second resin portion of the first sealing portion, and
   the surplus space is formed by the first sealing portion, the electrode plate of the negative terminal electrode, and the metal plate, and has air-tightness with respect to the outside of the power storage module.

2. The power storage module according to claim 1,
   wherein the first sealing portion includes a first resin portion welded to the third surface of the negative terminal electrode, and wherein the second resin portion extends from a peripheral edge portion of the first resin portion and the second resin is welded to the outer surface of the metal plate.

3. The power storage module according to claim 2, further comprising:
   a second sealing portion being joined to a plurality of the first sealing portions so as to surround an outer side of the first resin portions and the second resin portions of the first sealing portions,
   wherein the second sealing portion includes an overlapping portion overlapping the metal plate and the second resin portion when viewed from the first direction, and is welded to the second resin portion at the overlapping portion.

4. The power storage module according to claim 2,
   wherein the metal plate includes a frame-shaped to-be-welded portion welded to the first resin portion, and a to-be-contact portion located closer to the third surface of the negative terminal electrode in comparison to the to-be-welded portion on an inner side of the to-be-welded portion and being in contact with the third surface.

5. The power storage module according to claim 2,
   wherein regions welded to the sealing body located on the third surface, the fifth surface, and the sixth surface are roughened.

6. The power storage module according to claim 2,
   wherein a material that forms the metal plate is the same as a material that forms the electrode plate, and
   and an active material layer is not formed on the inner surface and the outer surface of the metal plate.

7. The power storage module according to claim 1,
   wherein the central region of the outer surface of the metal plate faces an outside of the power storage module.

8. A power storage device, comprising:
   a power storage module;
   a conductive plate disposed adjacent to the power storage module;
   the power storage module comprising:
   a stacked body including a plurality of electrodes stacked along a first direction;
   a metal plate being provided in one end of the stacked body in the first direction;
   a sealing body including a first sealing portion joined to the electrodes, and forming an inner space between the electrodes adjacent to each other and sealing the inner space; and an electrolytic solution being stored in the inner space and including an alkali solution,
wherein the electrodes include a plurality of bipolar electrodes, and a negative terminal electrode,
the first sealing portion includes a first resin portion disposed between the negative terminal electrode and the metal plate,
one surface of the first resin portion in the first direction is joined to the negative terminal electrode,
another surface of the first resin portion in the first direction is joined to the metal plate, and
the metal plate includes an inner surface facing the negative terminal electrode and an outer surface facing away from the negative terminal electrode, and the inner surface includes (i) a frame-shaped to-be-welded portion which is welded to the another surface of the first resin portion and (ii) a to-be-contact portion which is in contact with the negative terminal electrode, and
wherein
the conductive plate is located on and is in contact with a region of the outer surface of the metal plate that is opposite from the to-be-contact portion of the inner surface of the metal plate.

9. The power storage module according to claim 8,
wherein the bipolar electrodes include an electrode plate including a first surface and a second surface opposite to the first surface, a positive electrode provided on the first surface, and a negative electrode provided on the second surface,
the negative terminal electrode includes an electrode plate including a third surface and a fourth surface opposite to the third surface, and a negative electrode provided on the fourth surface, and is disposed between the bipolar electrodes and the metal plate at the one end of the stacked body in the first direction so that the fourth surface of the electrode plate of the negative terminal electrode faces the first surface of the electrode plate of the bipolar electrodes, and
the inner surface of the metal plate faces the third surface of the negative terminal electrode, and the outer surface of the metal plate is opposite to the inner surface of the metal plate, and the metal plate is welded to the first resin portion at a peripheral edge portion of the inner surface.

10. The power storage module according to claim 9, wherein:
the first sealing portion further includes a second resin portion that is welded to the first resin portion,
the second resin portion covers an outer peripheral portion of the outer surface of the metal plate and a central region of the outer surface of the metal plate is not covered with the second resin portion, and
the central region of the second resin portion of the metal plate is in contact with the conductive plate.

* * * * *